(12) United States Patent
Colner (10) Patent No.: US 9,229,617 B2
(45) Date of Patent: *Jan. 5, 2016

(54) SOFTWARE USER INTERFACE USING H-GRID NAVIGATION

(71) Applicant: Oracle International Corporation, Redwood Shores, CA (US)

(72) Inventor: Scott Colner, Portland, OR (US)

(73) Assignee: Oracle International Corporation, Redwood Shores, CA (US)

(*) Notice: Subject to any disclaimer, the term of this patent is extended or adjusted under 35 U.S.C. 154(b) by 329 days.

This patent is subject to a terminal disclaimer.

(21) Appl. No.: 13/962,889

(22) Filed: Aug. 8, 2013

(65) Prior Publication Data
US 2013/0326423 A1 Dec. 5, 2013

Related U.S. Application Data

(63) Continuation of application No. 12/358,146, filed on Jan. 22, 2009, now Pat. No. 8,543,945.

(51) Int. Cl.
*G06F 3/048* (2013.01)
*G06F 3/0482* (2013.01)
*G06F 17/30* (2006.01)

(52) U.S. Cl.
CPC ........ *G06F 3/0482* (2013.01); *G06F 17/30572* (2013.01)

(58) Field of Classification Search
CPC .................... G06F 3/0482; G06F 17/30572
USPC .................................................. 715/855, 841
See application file for complete search history.

(56) References Cited

U.S. PATENT DOCUMENTS

| 6,493,717 | B1 | 12/2002 | Junkin |
| 2005/0076311 | A1 | 4/2005 | Kusterer |
| 2006/0069684 | A1 | 3/2006 | Vadlamani |
| 2007/0156766 | A1 | 7/2007 | Huang |
| 2008/0162201 | A1 | 7/2008 | Sander |
| 2008/0270948 | A1 | 10/2008 | Lazzaro |

OTHER PUBLICATIONS

Oracle HGrid (Hierarchy Grid or Tree Table) obtained at http://www.oracle.com/technology/tech/blaf/specs/hgrid.html?_template=/ocom/print; Jun. 2, 2004; 15 pages.

(Continued)

*Primary Examiner* — Steven Sax
*Assistant Examiner* — Wilson Varga
(74) *Attorney, Agent, or Firm* — Trellis IP Law Group, PC (57) ABSTRACT

A hierarchical grid (H-Grid) is used to select a customer name after preliminary navigation has been performed. The preliminary navigation serves to identify an action, category or type of page to process or display data associated with the selected customer name. The H-Grid can be used in various ways as a replacement for, enhancement or addition to, key or query-based searching to retrieve a page or perform an action. In a particular example, the H-Grid includes customer names that have data available for display according to a form associated with a selected action or category. When the user clicks a customer name in the H-Grid a current form is populated with the customer's data. Subsequent navigation to other pages of data are populated with the currently selected customer name. This approach can replace the requirement of having the user to perform a search or query to identify the customer name or record.

10 Claims, 5 Drawing Sheets

(56) References Cited

OTHER PUBLICATIONS

Insurance Networking News, obtained at http://www.insurancenetworking.com/assets/article/4/BAM%20White%20paper.pdf; Jan. 14, 2009; 2 pages.
Oracle Peoplesoft Enterprise "PeopleSoft Enterprise Receivables 9.0 People Book"; Sep. 2006; 1287 pages.
Oracle Peoplesoft Enterprise "PeopleSoft Enterprise Smartviews"; Copyright 2007; 5 pages.
Microsoft Corporation "Walkthrough: Creating Master/Detail Web Pages in Visual Studio" obtained at http://msdn.microsft.com/en-us/library/stc0szde(printer).aspx; Jan. 22, 2009; 9 pages.

| Menu | Home | Working | MultiChannel Console | Add to Favorites | Signout |

Travel Administration
Billing
Accounts Receivable
  Pending Items
  Direct Debits
  Drafts
  Payments
  Credit Cards
  Customer Accounts
    - Customer
Information
  - Item Information
  - Item List Start
  - View/Update Item
  - Details
  - Item Sold
  - Mass Change Pro
  - Item Billing Data
  - Item Active From
    Group
New Window | Customer Page |

Customer Heirarchy
- USA01 - New World O
  - USA01 - New World
  - USA05 - SouthEast
    USA05 - SouthEas
    USA05 - MidWest
    - USA03 - Highlan
      USA03 - Highla
    - USA101 - Cou New Window | Customer Page |

Detail 1

Unit: US001     Customer: US401     New World Outdoor Equip. Inc.
Item ID: TEST ITEM   Line:           Days Late: 3070   Status: Open Accounting Date: 04/27/2000   Entry Type:         IN   Billing Unit:
                         USD   Entry Reason:            Original Amount: 100.00  USD
Balance: 156.02               AR Distribution Code: AR

Discount Options
Due Date: 05/27/2000        Due Days:
Terms:    21030 ⊙           Discount Days:
Discount Amount:            Date:
Discount Amount 1:          Date 1:
☐ Always Allow Discount
As of Date: 04/27/2000      Posted: 08/27/2005

Payment/Draft Options
Payment Method [Check] ☑ Pay by Credit Card
                         Pre Approved?
Draft Type:              Create Document?
Direct Debit Profile ID: One Item per Draft?

Customer Relations
☐ Dispute       Reason: [  ] ⊙ Date: [▼]
                Dispute Amount: [  ] ⊙ Date: [▼]
☐ Deduction     Reason: [  ] ⊙ Date: [▼]
☐ Doubtful
☐ Collection    Code:
Analyst:        MSW  ⊙ Morgan Wu
Collector:      JKB  ⊙ John Berkowitz
Sales Person:   002  ⊙ Angelini, Gina
AR Person:

Other Options
☑ Revaluation Flag    ☑ Available for Netting

Split    Item Action    Add A Conversation

[OK] [Cancel] [Apply] [$ Refresh]

Detail 1 | Detail 2 | Detail 3 | Item Activity | Item Accounting Entries | Item Audit History

*Figure 4*

| Item list | Advanced Search |

SetID: [SHARE] 🔍 Unit: [US001] 🔍 Customer: [　　　] 🔍 *Level [No Relationship ▼]

[Search]　Advanced Search

Row Selection

Range: [　　] [GO] [Select All] [Deselect All]

Item Action

[Select Action　▼] [GO]

Search Result Totals

Debits:　　　　Debit Amount:　　　　Currency:
Credits:　　　 Credit Amount:　　　 Currency:
Total:　　　　 Total Amount:　　　　Currency:
Selected:　　　　　　　　　　　　　 Selected Currency:

*Figure 5*
*(Prior Art)*

SOFTWARE USER INTERFACE USING H-GRID NAVIGATION

CROSS REFERENCES TO RELATED APPLICATIONS

This application is a continuation of the following application, U.S. patent application Ser. No. 12/358,146, entitled "SOFTWARE USER INTERFACE USING H-GRID NAVIGATION IN HUMAN RESOURCE MANAGEMENT OR CUSTOMER RELATIONSHIP MANAGEMENT APPLICATIONS," filed on Jan. 22, 2009, which are hereby incorporated by reference, as if set forth in full in this specification.

BACKGROUND

Computer software provides many functions and benefits and is able to handle many different types of information. As the functionality and complexity of software increases it may be more difficult for a human user to interact with and control the software. In order to improve the usability of software, it is often important to provide an efficient user interface.

One type of task that is typically handled by a user interface is selecting an item from a collection or group of items. For example, the item can be a name of a person, company, department, form, etc. in a table, list, menu or other presentation of the items. Optimizing the item presentation and selection process can produce benefits, especially if there are many items of different categories that are difficult to navigate among in a program that requires several or many item selections in order to perform a task.

Examples of programs that require user selection of many items during the course of a session include Human Resource Management Software (HRMS), Customer Relationship Management (CRM), office productivity applications, etc. In a particular example, a user may wish to view a specific page of information about a single customer's account receivable. In traditional systems, the user might be required to navigate among multiple categories (e.g., Administration, Billing, Account Receivable) that are organized as headings or folders. Within each folder the user may have to further select a subcategory or sub-folder (e.g., Billing Data, Activity, Item List, etc.).

Once the user has navigated to the desired category then a search may be required in order to obtain a specific record or page within that category. The user may have to input numbers or text to identify a specific "key" for a page so that the page can be retrieved based on the key. If the user does not know the key then additional descriptive information can be entered to assist the user to identify the key or the page. The user might also be allowed to form a relational query for a search for the page such as by entering all or a part of a name, date range, numeric range, etc.

SUMMARY

A particular embodiment uses a hierarchical grid (H-Grid) to select a customer name after preliminary navigation has been performed. The preliminary navigation serves to identify an action, category or type of page to process or display data associated with the selected customer name. The H-Grid can be used in various ways as a replacement for, enhancement or addition to, key or query-based searching to retrieve a page or perform an action. In a particular example, the H-Grid includes customer names that have data available for display according to a form associated with a selected action or category. When the user clicks a customer name in the H-Grid a current form is populated with the customer's data. Subsequent navigation to other pages of data are populated with the currently selected customer name. This approach can replace the requirement of having the user to perform a search or query to identify the customer name or record.

One embodiment provides a method comprising displaying a menu of expandable folders in a user interface for a customer relationship application; accepting a signal from a user input device to select a type of customer record within the menu of expandable folders; displaying customer names associated with the selected type of customer record in an H-Grid; accepting a signal from the user input device to select a customer name in the H-Grid; and displaying a form, wherein at least a portion of the form is populated with information corresponding to the selected customer name.

A further understanding of the nature and the advantages of particular embodiments disclosed herein may be realized by reference of the remaining portions of the specification and the attached drawings.

DETAILED DESCRIPTION OF EMBODIMENTS

A particular embodiment of the invention is described with respect to a software product, Peoplesoft™ HRMS and related software, that is manufactured and distributed by Oracle International Corporation of Redwood City, Calif. ("Oracle"). It should be apparent that this is merely for ease of illustration. Embodiments and elements of the invention may be used with any other suitable software. Details of the Oracle product may be found in references such as the PeopleSoft line of user's guides referred to as "PeopleBooks™" that include more specific documentation such as "PeopleSoft Enterprise Receivables PeopleBook™," all made available by Oracle, and which are hereby incorporated by reference as if set forth in full in this document for all purposes.

Figure 1:
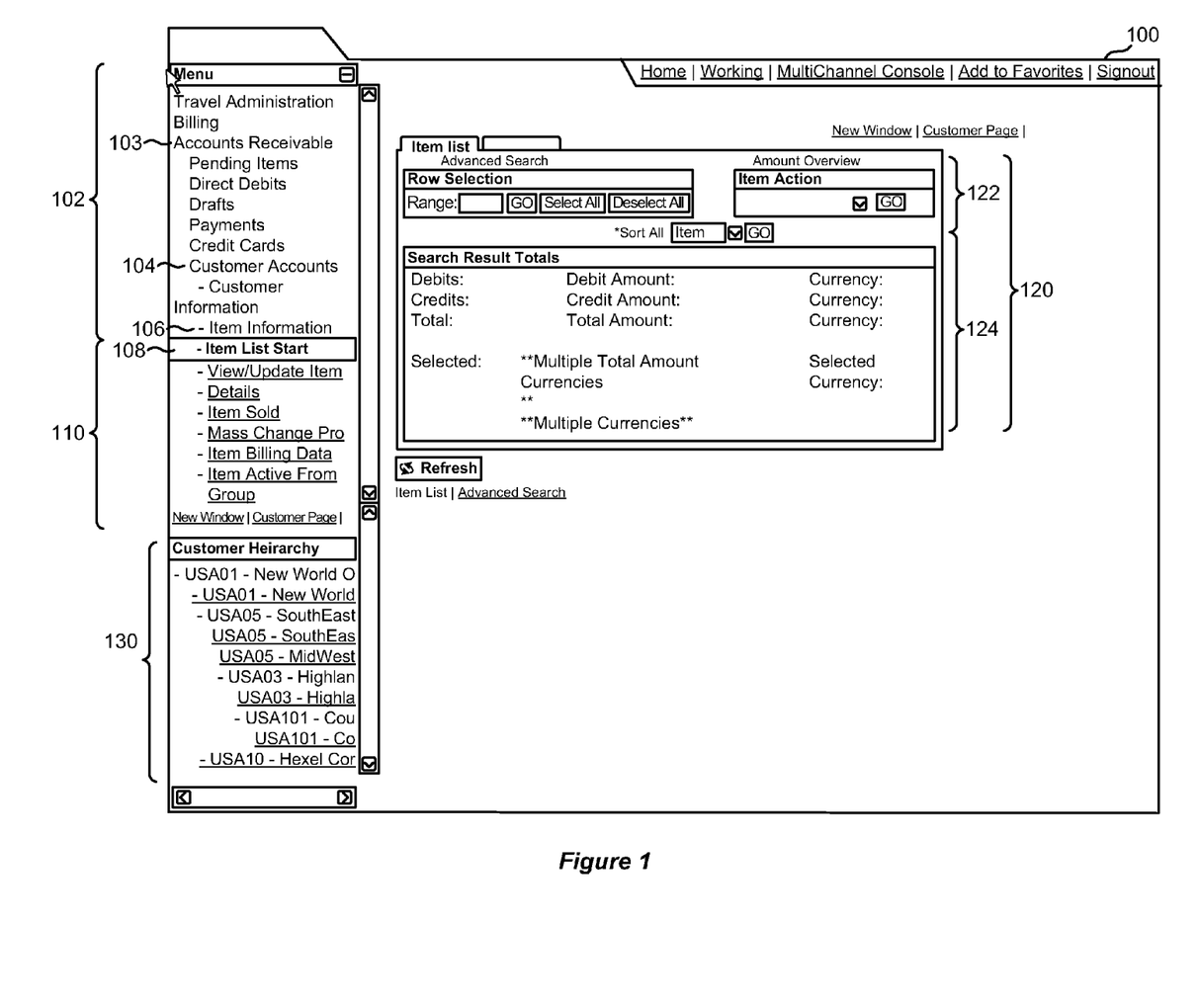
FIG. 1 illustrates a portion of a screen display in an embodiment of the invention.

FIG. 1 illustrates a portion of a screen display 100 in a user interface for an example software application. In FIG. 1, the user interface is provided with a left-side navigation sidebar that includes areas 102, 110 and 130. The right side of the screen is the main display area for showing information about the category or item selected via the navigation sidebar. The placement and details of many of the display mechanisms discussed herein may be changed without departing from the scope of the invention. For example, the navigation sidebar may be placed on the right side, top or bottom of the display. It can reside on a different page or in a different part of the display, or take a different form other than a narrow strip or bar. In general, many changes can be made to the specific type of display format, as desired, and still remain within the scope of the claims unless otherwise noted.

The navigation sidebar includes expanding menu folders at 102. Each folder can include sub-folders. The sub-folders can be displayed by clicking on an expansion icon to the left of each folder name. For example, in FIG. 1, the folder "Accounting Receivable" has been expanded to show multiple sub-folders associated with the category "Account Receivable". The sub-folder "Customer Accounts" 104 within "Accounting Receivable" has also been expanded. The folder "Item Information" 106 is, in turn, within "Customer Accounts" and has also been expanded to show hyperlinks at 110. Hyperlink "Item List Start" 108 has been selected by the user and is shown highlighted within the navigation sidebar. Thus, the preliminary navigation performed so far by using the expandable folders menu has determined the category within which the user desires to view a page of information as Account Receivable->Customer Accounts->Item Information.

Figure 5:
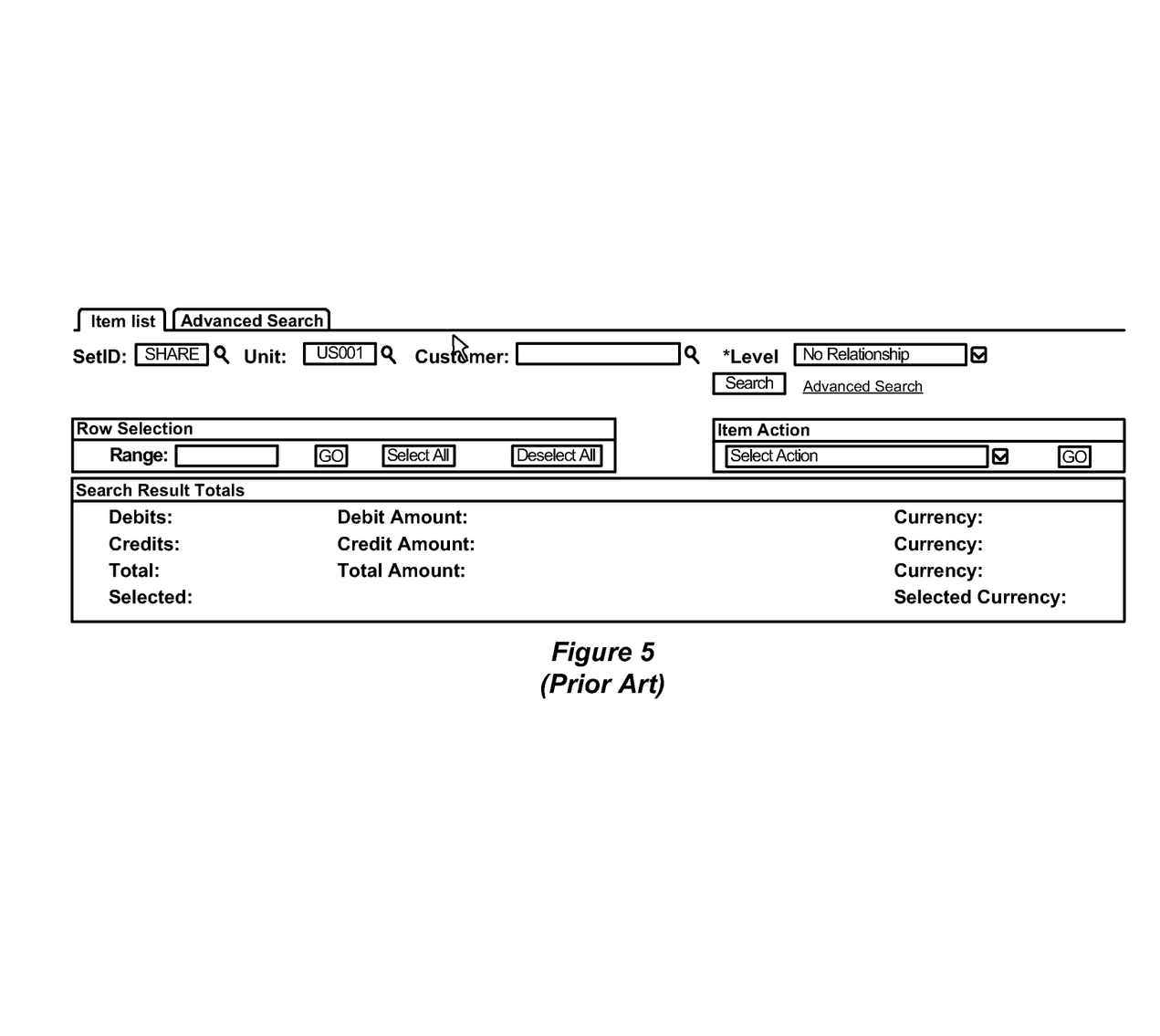
FIG. 5 shows a prior art search tool.

Main area 120 of the display shows a panel that is used to obtain Item Information pages. Search tools are provided at 122. In a particular prior art approach the user would be required to identify a particular record or records by using the search tools. Such a search tool is shown, for example, in FIG. 5. As described below, a particular embodiment of the invention allows the user to choose a particular page of information within the selected category by using an H-Grid. Form area 124 of the display shows a blank "form" that indicates the various fields of the Item Information type of record, or page. The fields are blank since although the category has been chosen the particular pages of interest have not been determined yet.

H-Grid Area 130 shows a portion of the H-Grid for the selected category. In a particular embodiment, the H-Grid is not displayed until the user has completed navigation to a category by using the expanding menu folders shown at 102 and 110. This approach allows all of the navigation space (i.e., the left-hand sidebar) to be used for display of folder names. Once a category is selected then the H-Grid appears and about half of the sidebar is used for H-Grid display. The size of the navigation area can be modified horizontally or vertically by using window size controls as is known in the art.

Figure 2:
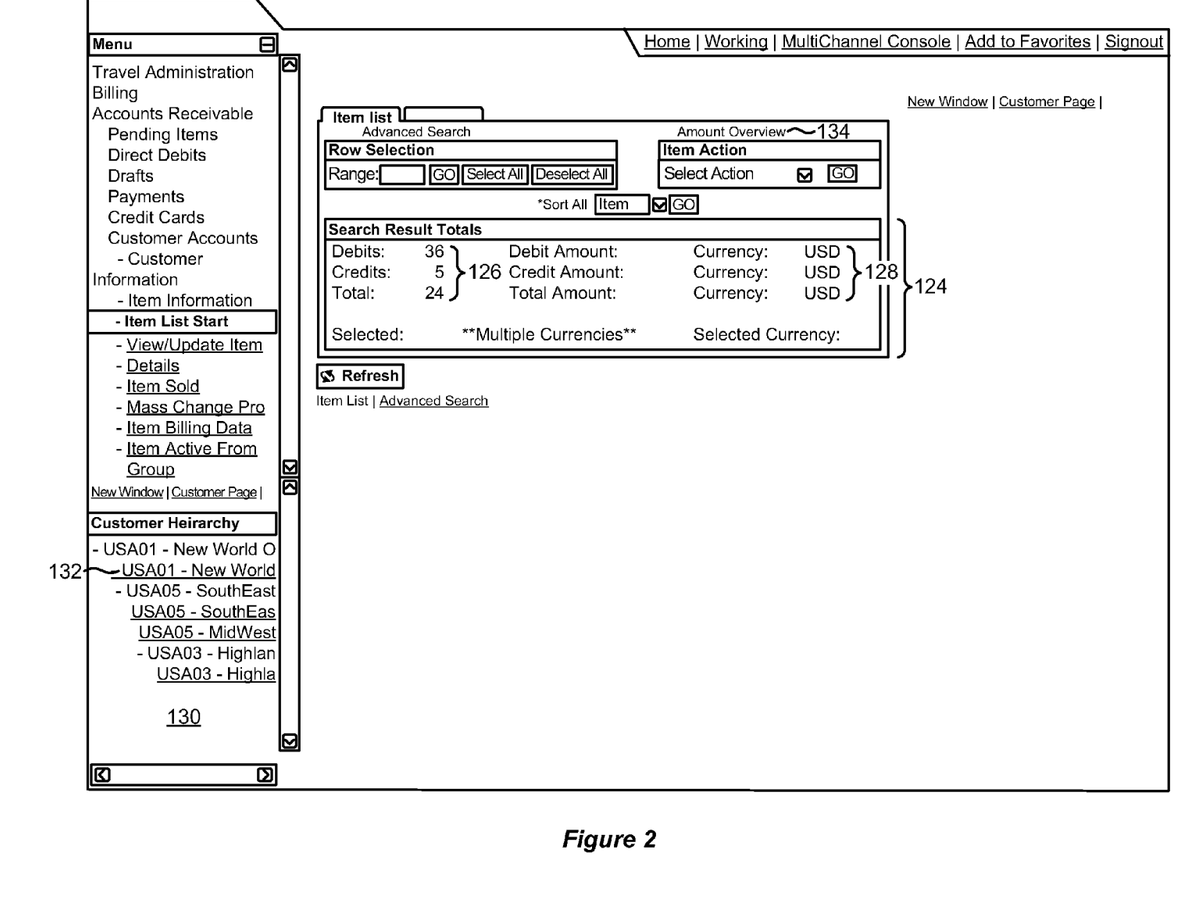
FIG. 2 shows a form area populated with data in response to a user selection of customer name in an H-Grid.

FIG. 2 shows form area 124 populated with data in response to a user selection of customer name 132 in the H-Grid. In this example, the customer name is "New World Outdoor Equipment, Inc." As shown in H-Grid area 130, the H-Grid includes summarization lines allowing groupings of individual lines into subtotal and total lines. These summarization lines are preceded by a "+/−", i.e. "collapse" icon, allowing the user to display or hide the detail lines of data that make up the summary information from the summarization lines. Information on the summarization lines is displayed in bold font, and information on detail lines is displayed in regular font and indented to make it easier for the user to distinguish summary and detail information. Thus, customer name entries in the H-Grid each include a heading in bold with an associated collapse icon. When expanded, hyperlinks or other text or information associated with the expanded customer name appear below the customer name. The customer names are shown in a hierarchy where names that are considered part of, or subsidiary to, a parent name are shown below the parent name and indented. Other ways to show a hierarchical relationship among the H-Grid names (or other H-Grid items, not shown) are possible. For example, text size, font, color or other characteristics can be used (italics, bold, animation, etc.). Depending upon a display device's capabilities a hierarchy may be shown in three or more dimensions. Other variations are possible.

In FIG. 2, form area 124 is now populated with data that is relevant for the selected customer name 132. Thus, values at 126 and 128 show information such as the number of debit/credit entries and type of currency associated with the customer name. The form that is populated is the form used by "Item List Start," which was the selected item in the expandable menu of FIG. 1. In a particular embodiment, when an action or item in the expandable menu is selected then a task starts to obtain the data entries for all customers that are relevant to populate the current form. This can improve the performance of the system while waiting for the user to select the actual customer name in the H-Grid. One common type of action illustrated in the present example is to display customer information in a particular style or format.

Once the H-Grid is loaded with data, the user will be able to navigate directly to the desired page by clicking on the hyperlinks of the detail lines inside the H-Grid area. In a particular embodiment, the navigation is initiated from PeopleCode™ that is attached to a record used in the H-Grid. For example, an H-Grid can be populated with customer Balance and Past Due Balance information. The H-Grid represents data from the corporate customer tree, i.e. Balances and Past Due Balances are accumulated at individual customer levels, and summarized on corporate parent levels, based upon corporate parent/child relationships established in the Customer Master table.

Once the data is loaded into the H-Grid, the user can directly navigate to the item activity page for the customer that is referred to in a detail line of the H-Grid. Since the search keys are already available in the H-Grid, these keys can be passed on within the navigation command, the search page can be bypassed, and the transaction detail or inquiry page can be called directly from the H-Grid.

There can be many ways to populate an H-Grid with data for navigational purposes. In the present example, the H-Grid was populated with customer data. However, an entirely different H-Grid could be populated with menu and folder information similar to the folders and content reference information in the Menu area.

The H-Grid can provide an alternative way of navigating through enterprise application components. Navigation through the H-Grid can bypass search pages, and directly link into resulting detail pages (assuming that search keys have been populated in the H-Grid). By selecting different rows in the H-Grid, all data related to the different keys stored in the different rows of the H-Grid can be displayed immediately on the page. In addition to functioning as a navigational element, the H-Grid also provides visibility into data structures. For example, while being able to navigate to the Item Detail page by clicking on an H-Grid row, the customer hierarchy is also visible in the H-Grid area.

Data like search keys can be populated in the H-Grid, before it can be used to navigate through application components. This can be done programmatically, after navigating to a page using the standard Menu area, or during user login if no Menu is available. The H-Grid can be populated with search keys at any point for a particular user. If the user only works on Customer related data then the entire main menu (i.e. area 102) could be replaced with the H-Grid. Alternatively, the user could see the Customer H-Grid as soon as they click on a Customer related folder like "Customer Accounts" under "Account Receivable" in the main menu. In this approach, the user doesn't have to navigate to a specific page using the main menu in order to see the H-Grid. It could be displayed programmatically when the user enters a section of the menu structure that is specific to the data displayed in the H-Grid which, in the present example, is Customer.

Figure 3:
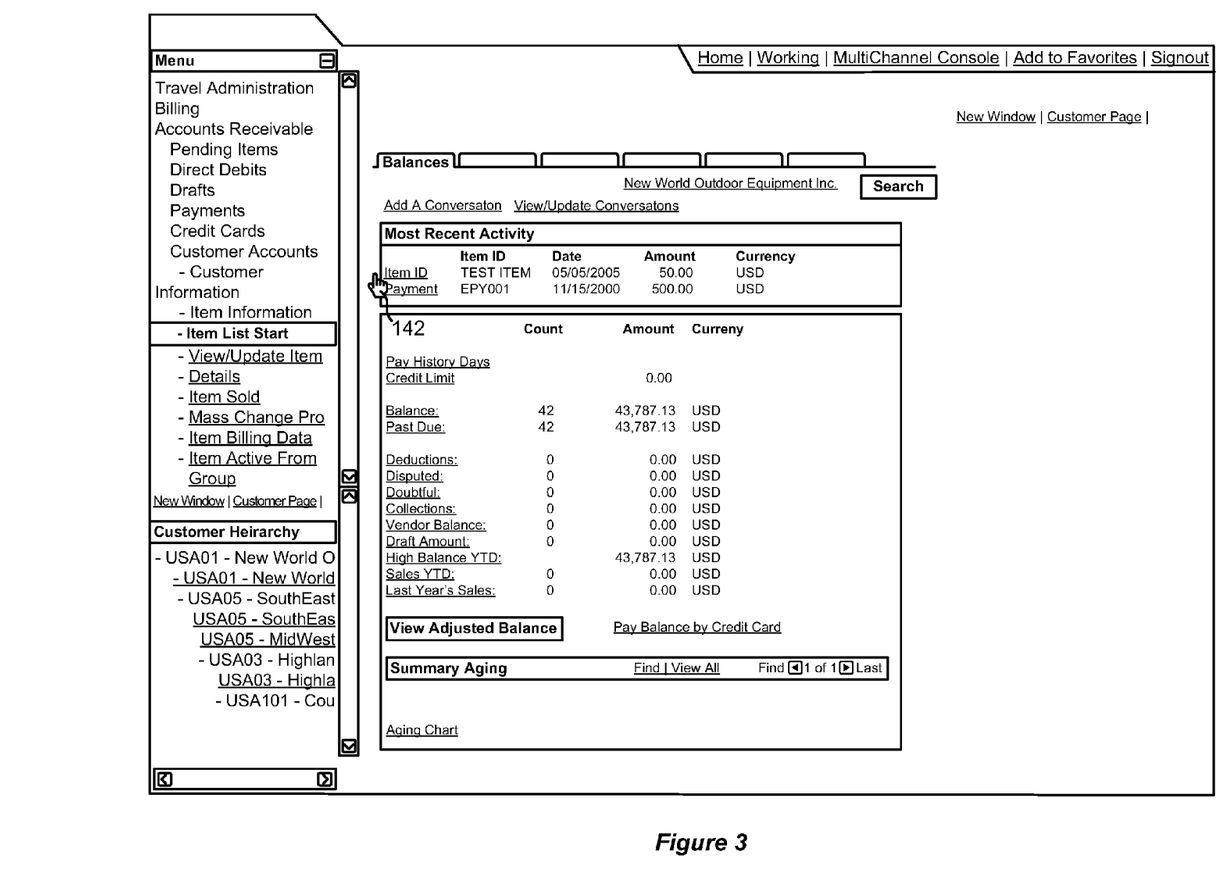
FIG. 3 shows the display after the user has selected a first link.

FIG. 3 shows the display after the user has selected the "Account Overview" link 134 in FIG. 2. In FIG. 3, the customer name selected in the H-Grid is now used to generate the Account Overview pages. Once a customer name is selected in the H-Grid, the user can navigate to any of the links or other options shown in the main area and the values corresponding to the selected customer name are presented.

Figure 4:
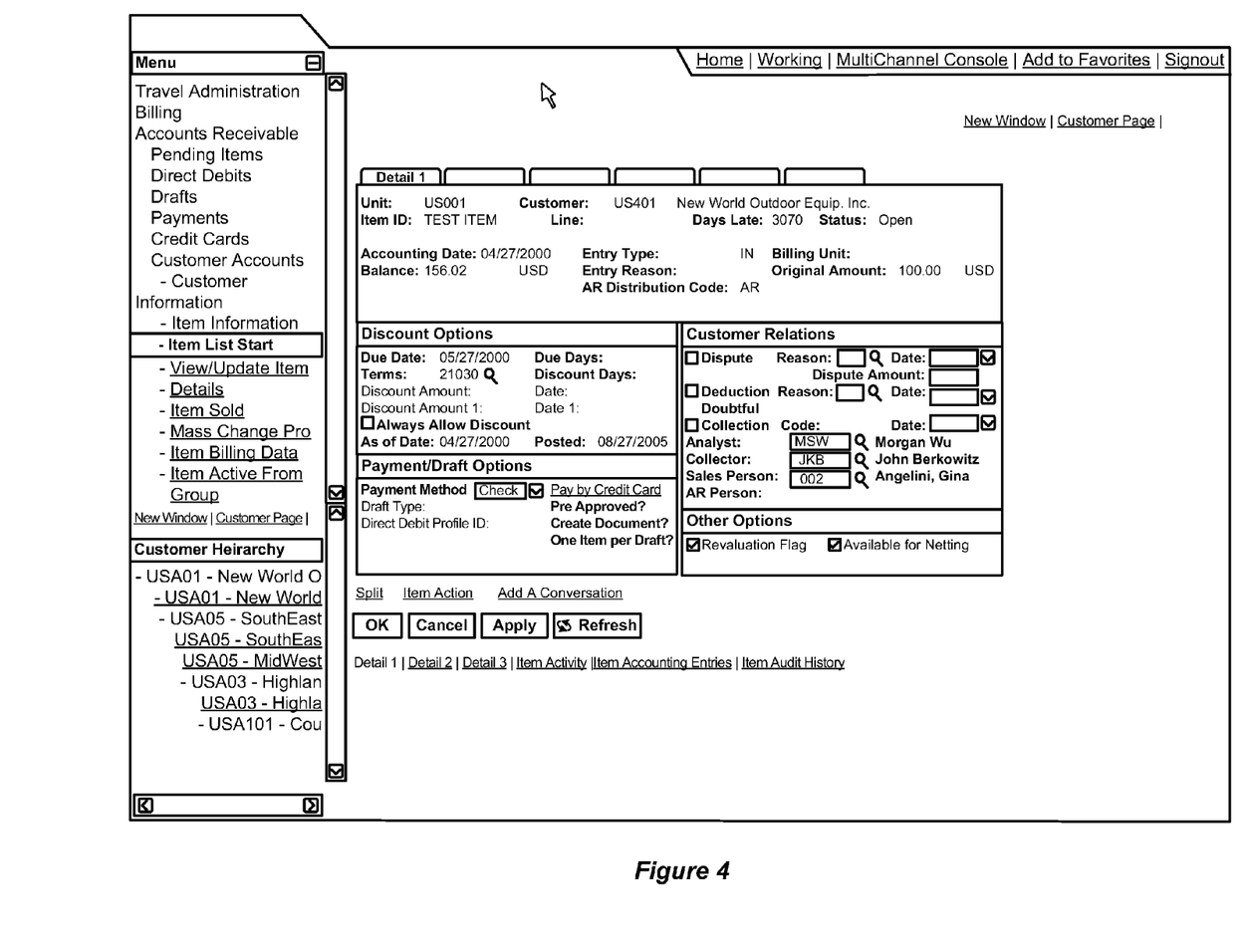
FIG. 4 shows the display after the user has selected a second link.

FIG. 4 shows the display after the user clicks on Item ID link 142 of FIG. 3. In a particular embodiment, if the user goes back to the expandable folders menu and selects a different action then the previously selected customer name is maintained as the current customer name and any relevant forms or displays are populated with information related to the current customer.

Being able to immediately navigate to item inquiry information from summarized customer balance information can allow users to make better and faster decisions while operating the software, especially when dealing with corporate customers. For example, the overdue balance amount at the corporate parent could be taken into account before making decisions about credit holds or collection calls for individual customers. As a result, organizations using embodiments of the invention could achieve improved cash flow, lower performance metrics such as "Day Sales Outstanding" (DSO), realize improved relationships with their largest customers, or benefit from other improved efficiencies.

Although the description has been described with respect to particular embodiments thereof, these particular embodiments are merely illustrative, and not restrictive. For example, although the format of presenting data has primarily been described using forms, web pages, hyperlinks and the like, many other ways of arranging the data for presentation can be acceptable for use with embodiments of the invention. For example, any format of the data (e.g., tables, spreadsheets, word processing documents, custom formatting or any other type of display for a record or entry) can be used. Hyperlinks can be used to detect user inputs and to perform an action based on a user selection. User selection can be handled by software executing at the user's computer or otherwise executing on one or more processes and/or processors either local to or remote from a user's machine or interface.

Any suitable programming language can be used to implement the routines of particular embodiments including C, C++, Java, assembly language, etc. Different programming techniques can be employed such as procedural or object oriented. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method comprising:
    displaying a menu of expandable folders in a user interface for a customer relationship application;
    accepting a signal from a user input device to select an action within the menu of expandable folders, wherein the action includes a transaction from one from a set of software applications;
    in response to selecting the action, displaying a particular form with at least two blank data fields to be filled in, one blank field not being for a customer name;
    displaying at least two customer names in a hierarchical grid wherein the at least two customer names represent customers with data available to display for the action selected within the menu of expandable folders, wherein at least a portion of the form, at least a portion of the menu of expandable folders, and at least a portion of the hierarchical grid are displayed simultaneously, wherein the at least a portion of the hierarchical grid includes the at least two customer names having a displayed hierarchy;
    accepting a signal from the user input device to select a customer name in the hierarchical grid from among the at least two customer names;
    displaying information associated with the selected customer name in the at least one blank data field of the form automatically in response to the selection of the selected customer name, the information specific to both the selected customer name and to the selected action; and
    accepting a signal from the user input device to select a different action, wherein the different action includes a different transaction from the set of software applications, and presenting at least a portion of a different form in response to the selected different action, wherein the different form is populated with data specific to the selected customer name and that different form.

2. The method of claim 1, wherein the action includes displaying customer information in a particular format.

3. The method of claim 1, further comprising:
    retrieving data associated with multiple customer names after the user has selected an action.

4. The method of claim 1, further comprising:
    accepting a signal from the user input device to select a different action;
    presenting a different display in response to the selected different action, wherein the different display is populated at least in part with data related to the selected customer name.

5. The method of claim 4, further comprising:
maintaining the selected customer name as the current name so that different actions selected by the user provide results using data associated with the selected customer name.

6. The method of claim 1, wherein the method is used in a Human Resource Management Software (HRMS) software application.

7. The method of claim 1, wherein the method is used in a Customer Relationship Management (CRM) software application.

8. The method of claim 7, wherein the method is used in an account receivable operation of the CRM software application.

9. An apparatus comprising:
one or more processors;
logic encoded in one or more tangible media for execution by the one or more processors and when executed operable for:
displaying a menu of expandable folders in a user interface for a customer relationship application;
accepting a signal from a user input device to select an action within the menu of expandable folders, wherein the action includes a transaction from one from a set of software applications;
in response to selecting the action, displaying a particular form with at least two blank data fields to be filled in, one blank field not being for a customer name;
displaying at least two customer names in a hierarchical grid wherein the at least two customer names represent customers with data available to display for the action selected within the menu of expandable folders, wherein at least a portion of the form, at least a portion of the menu of expandable folders, and at least a portion of the hierarchical grid are displayed simultaneously, wherein the at least a portion of the hierarchical grid includes the at least two customer names having a displayed hierarchy;
accepting a signal from the user input device to select a customer name in the hierarchical grid from among the at least two customer names;
displaying information associated with the selected customer name in the at least one blank data field of the form automatically in response to the selection of the selected customer name, the information specific to both the selected customer name and to the selected action; and
accepting a signal from the user input device to select a different action, wherein the different action includes a different transaction from the set of software applications, and presenting at least a portion of a different form in response to the selected different action, wherein the different form is populated with data specific to the selected customer name and that different form.

10. A non-transitory computer-readable storage device including instructions executable by a processor for:
displaying a menu of expandable folders in a user interface for a customer relationship application;
accepting a signal from a user input device to select an action within the menu of expandable folders, wherein the action includes a transaction from one from a set of software applications;
in response to selecting the action, displaying a particular form with at least two blank data fields to be filled in, one blank field not being for a customer name;
displaying at least two customer names in a hierarchical grid wherein the at least two customer names represent customers with data available to display for the action selected within the menu of expandable folders, wherein at least a portion of the form, at least a portion of the menu of expandable folders, and at least a portion of the hierarchical grid are displayed simultaneously, wherein the at least a portion of the hierarchical grid includes the at least two customer names having a displayed hierarchy;
accepting a signal from the user input device to select a customer name in the hierarchical grid from among the at least two customer names;
displaying information associated with the selected customer name in the at least one blank data field of the form automatically in response to the selection of the selected customer name, the information specific to both the selected customer name and to the selected action; and
accepting a signal from the user input device to select a different action, wherein the different action includes a different transaction from the set of software applications, and presenting at least a portion of a different form in response to the selected different action, wherein the different form is populated with data specific to the selected customer name and that different form.

* * * * *